(12) United States Patent
Michel et al.

(10) Patent No.: US 7,664,624 B2
(45) Date of Patent: Feb. 16, 2010

(54) METHOD FOR DETERMINING THE ACID GAS STORAGE CAPACITIES OF A GEOLOGIC MEDIUM BY MEANS OF A MULTIPHASE REACTIVE TRANSPORT MODEL

(75) Inventors: Antony Michel, Le Chesnay (FR); Laurent Trenty, Deuil-La-Barre (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 457 days.

(21) Appl. No.: 11/608,983

(22) Filed: Dec. 11, 2006

(65) Prior Publication Data

US 2007/0143024 A1  Jun. 21, 2007

(30) Foreign Application Priority Data

Dec. 12, 2005   (FR)   ................... 05 12714

(51) Int. Cl.
  *G06F 17/50*   (2006.01)
  *G06G 7/48*   (2006.01)
(52) U.S. Cl. ............. 703/2; 703/9; 703/10; 702/50
(58) Field of Classification Search .......... 703/2, 703/9, 10; 702/50
  See application file for complete search history.

(56) References Cited

U.S. PATENT DOCUMENTS

2006/0129366 A1*  6/2006  Shaw ........................ 703/10
2006/0184329 A1*  8/2006  Rowan et al. ................ 702/50
2006/0184346 A1*  8/2006  Panga et al. .................. 703/9
2007/0016389 A1*  1/2007  Ozgen ....................... 703/10
2007/0244681 A1* 10/2007  Cohen et al. ................ 703/10

* cited by examiner

*Primary Examiner*—Thai Phan
(74) *Attorney, Agent, or Firm*—Antonelli, Terry, Stout & Kraus, LLP.

(57) ABSTRACT

Method for determining acid gas storage capacities of an underground geologic medium by means of a multiphase reactive transport model.

The geologic medium is divided into a set of sub-volumes for which connections are defined. A multiphase reactive transport model is then defined by dividing, according to a transfer rate principle, the phenomena involved in the behaviour of said geologic medium into two parts. A first part is treated by a first sub-model of "compositional multiphase reservoir" type allowing the transfer rates linked with the gas phase to be determined. A second part is treated by a model of "single-phase reactive transport" type allowing the transfer rates linked with the water and the solid to be determined. The model is initialized by means of data acquired in the field or in the laboratory. The acid gas storage capacities of the medium are determined from the reactive transport model.

Application: acid gas storage in a natural reservoir.

12 Claims, 5 Drawing Sheets

METHOD FOR DETERMINING THE ACID GAS STORAGE CAPACITIES OF A GEOLOGIC MEDIUM BY MEANS OF A MULTIPHASE REACTIVE TRANSPORT MODEL

FIELD OF THE INVENTION

The present invention relates to a method for determining the hydrodynamic processes leading to the transport of chemical constituents, as well as the chemical processes involved in a geochemical system.

In particular, the present invention allows to determine the acid gas ($H_2S$, $CO_2$, $CH_4$) storage capacities of an underground medium by modelling transport and chemical reaction processes in a porous medium.

All the useful scales can be concerned: laboratory, well, reservoir and regional basin survey.

The method can also find direct applications in the study of soil depollution using multiphase processes (venting, use of chlorinated solvents).

BACKGROUND OF THE INVENTION

The reduction of acid gas emissions such as industrial $CO_2$ has become a major challenge for the environment, and therefore for many industrialists. One solution for reducing these emissions is based on the geologic sequestration of these gases. The principle consists in capturing the $CO_2$ at the emission point thereof (power plant, cement plant, steelworks ...), in concentrating it and in transporting it to a suitable geologic site for storage. Technologies for capturing and storing $CO_2$ are already available. This option has been widely studied for some years at the international level, especially by the petroleum industries that see a second advantage therein: the development of the geologic storage of carbon dioxide by injecting $CO_2$ in support to an enhanced oil recovery (EOR) operation or enhanced natural gas recovery in unworkable coal veins (ECBM; Enhanced Coalbed Methane) and in natural gas reservoirs (EGR; Enhanced Gas Recovery). In this context, the option considered for $CO_2$ storage is the use of natural underground reservoirs (depleted oil and gas reservoirs, unworkable coal fields, saline aquifers and saline cavities). This type of embodiment is illustrated in FIG. 1, where a producing well (PROD) extracts hydrocarbons from the subsurface while an injection well (INJ) re-injects $CO_2$ into the reservoir.

The cost linked with the development of a storage site being high, the economic challenges and the environmental impacts being also great, it is necessary, in order to develop such acid gas storage methods in natural geologic reservoirs, to perfectly determine the long-term storage conditions. This mainly consists in studying migration of the gas within the reservoir and the precipitation and dissolution reactions to determine the quality of a storage site in the course of time.

A technical solution to this long-term storage site evaluation problem is provided by techniques allowing geochemical systems to be modelled.

The following documents that are mentioned in the description hereafter illustrate the prior art:

[1] G. T. Yeh and V. S. Tripathi "A Critical Evaluation of Recent Developments in Hydrogeochemical Transport Models of Reactive Multichemical Components", Water Resources Research, Vol. 25. No. 1, 93-108, January 1989,

[2] Y. Le Gallo, O. Bildstein and E. Brosse "Coupled reaction-flow modeling of diagenetic changes in reservoir permeability, porosity and mineral composition.", Journal of Hydrology 209 (1-4), 366-388, August 1998,

[3] J. W. Johnson, J. J. Nitao, C. I. Steefel, K. G. Knauss "Reactive transport modelling of $CO_2$ storage in saline aquifers to elucidate fundamental processes, trapping mechanisms, and sequestration partitioning", GS-London Spec. Pub. ms, Aug. 8, 2002,

[4] Long Nghiem, Peter Sammon, Jim Grabenstetter and Hiroshi Ohkuma, "Modeling $CO_2$ Storage in Aquifers with a Fully-Coupled Geochemical EOS Compositional Simulator", SPE 89474, April 2004,

[5] Tianfu Xu and K. Pruess "Modeling multiphase no-isothermal fluid flow and reactive geochemical transport in variably saturated fractured rocks: 1. Methodology", American Journal of Science, Vol. 301, P. 16-33, January 2001,

[6] Hui Cao "Development of techniques for general purpose simulators", PhD Stanford University, June 2002,

[7] Jacob Bear "Dynamics of Fluids in Porous Media", American Elsevier, 1972. Reprinted with corrections, Dover, N.Y., 1988.

The past thirty years, there has been a large increase in the number of methods allowing geochemical systems, whether natural or induced, to be modelled. What is referred to as geochemical system is a porous medium such as a rock volume wherein at least an aqueous phase and possibly a gas phase circulate. These systems are characterized by two types of processes:

a fluid transport process, a process of chemical reactions between the various elements that are the medium and the aqueous and gas phases: rock/water and water/gas for example.

Precise modelling of these geochemical systems allows for example to determine the acid gas trapping mechanisms in geologic formations. Such a modelling also allows to determine the soil depollution conditions using multiphase processes.

The models used must be representative of the behaviour of these geochemical systems. Such models are based on the mass conservation principle: the mass is neither created nor destroyed in the system, but transferred between the solid, the aqueous phase and the gas phase. There are two types of models:

the models that do not take account of transport processes. These models are referred to as "chemical reaction models" or simply "batch models";

the models that consider both the transport and the chemical reaction processes are called "reactive transport model". One then refers to coupled modelling.

Definition of such models is complex and their use can be limited by computer capacities and/or by the computing time that increases considerably depending on the number of constituents to be considered. The chemical constituents, such as $CO_2$, $H_2O$ or NaCl for example, can be present either in the gas phase or in the water phase.

Geochemical system models were first used to understand the basic phenomena linked with water chemistry or with the evolution of diagenetic processes (see [2]). For about ten years, models were directed towards the analysis of the environmental impact of soil pollution, of biogas emissions in dumps or the study of radioactive waste storage (see [3] [4]). Finally, their use was recently extended to the study of acid gas ($H_2S$, $CO_2$, $CH_4$) geologic storage.

A reactive transport model allows to simulate the hydrodynamic processes leading to migration and dispersion of constituents (transport) linked with geochemical processes (chemical reactions). Initially used to solve hydrogeologic systems (see [2]), reactive transport models are increasingly used to simulate $CO_2$ injection, migration and storage in geologic layers (see [3] [4]). Introduction of a constituent initially present in gaseous form ($CO_2$) requires to consider models that are no longer single-phase models (water only), but two-phase models (water-gas), and therefore to increase the number of unknowns of the model.

From a general point of view, a reactive transport model is a method allowing to find the solution to a system of equations of the type as follows:

$$\frac{\partial(\phi \cdot C_i)}{\partial t} = L(c_i) + R(C_i) \quad (1)$$

where $\phi$ is the porosity of the medium, $c_i$ the concentration of constituent i in the mobile phases (fluids) and $C_i$ the total concentration (fluids+rock). We thus have the relation: $C_i = c_i + \bar{c}_i$ where $\bar{c}_i$ is the "motionless" phase (concentration in the motionless phase: the rock). $L(c_i)$ defines the transport operator of constituent i and $R(C_i)$ the chemical reaction operator.

System (1) is difficult to solve because of the large number of unknowns and of the great non-linearities induced by the reaction terms. Today there are essentially two approaches for solving such systems:

1. an iterative sequential solution method;
2. a simultaneous solution method.

Each one of these approaches can be solved explicitly or implicitly. A solution is referred to as explicit when one seeks the solution to a temporal system with t+dt by means of state t.

The first one, the iterative sequential solution method, is the most commonly used for solving this type of problem (see [2]). It consists in solving the system of equations in two stages: a transport stage without reaction and a stage of chemical reactions cell by cell (during the same time interval). Yeh and Tripathi have shown (see [1]) that an iterative loop has to be added to be able to sufficiently minimize the numerical errors on mass conservation. This sequential solution method was developed and analyzed for 2D or 3D water single-phase reactive flow modelling in porous media. It has been lately extended to the modelling of multiphase problems by Xu et al. (see [5]).

The second one, the simultaneous solution method, solves the complete system in a single stage. This method allows to solve complex geochemical systems and it is theoretically very robust. In practice, as shown by Yeh and Tripathi in a reference paper (see [1]), it can quickly become costly in CPU time and in memory space for complex systems. The models developed from these approaches were till now reserved for water single-phase flows. Recent studies such as Nghiem et al.'s (see [4]) show that such an approach can now be considered for 3D compositional multiphase problems, but with a limited number of constituents, which is not precise enough to allow an application within the context of acid gas storage capacity evaluation.

The method according to the invention turns to good account the advantages of the sequential methods (local time intervals, parallelization, reduced memory size) while avoiding addition of another iterative loop. It thus meets the requirements linked with the evaluation of the acid gas ($H_2S$, $CO_2$, $CH_4$) storage capacities of an underground medium representing a complex multiphase geochemical system.

SUMMARY OF THE INVENTION

The invention relates to a method for determining the capacities of an underground geologic medium for storage of at least one acid gas, the medium comprising a solid phase and an aqueous phase. The method comprises the following stages:

a) dividing said medium into a set of sub-volumes referred to as cells, b) defining a multiphase reactive transport model by coupling a sub-model of "compositional multiphase reservoir" type, dedicated to determination of the transfer rates linked with the gas, with a sub-model of "single-phase reactive transport" type, dedicated to determination of the transfer rates linked with said aqueous phase and said solid phase, c) carrying out data acquisition so as to initialize said multiphase reactive transport model, d) determining, for a given time period t, chemical constituents transport processes and chemical reaction processes within said geologic medium, by solving by coupling said reactive transport model at any cell of said medium, so as to obtain at least:

the amounts of gas present in said geologic medium, that have migrated outside said medium and to the surface, precipitated and dissolved in the aqueous phase, the solid phase alterations by precipitation and dissolution, e) deducing therefrom the capacities of said geologic medium for storing said acid gas.

According to the invention, said reactive transport model can be solved over time period t by means of a time-dependent evolution scheme wherein this time period is divided into a finite number of time intervals and by carrying out the following stages:

a) defining the duration of a time interval to synchronize the two sub-models, b) solving the "compositional multiphase reservoir" sub-model, c) solving the "single-phase reactive transport" sub-model by means of the results obtained in stage b), d) changing the duration of said time interval and repeating the procedure from stage b) by taking account of the results obtained in stage c) until said time period t is covered.

The transfer rates linked with the gas can comprise at least one of the following terms:
source terms of said gas,
terms of phase change between the gas and the aqueous phase,
terms of gas flow within said medium.

The transfer rates linked with said aqueous phase and said solid phase can comprise at least one of the following terms:
terms of precipitation and dissolution reactions between the aqueous phase and the solid phase,
terms of speciation reaction within the aqueous phase,
terms of aqueous phase flow within said medium,
source terms of the aqueous phase.

According to the invention, at least one of the following phenomena can be determined from said multiphase reactive transport model:
the displacements of said aqueous phase and of said gas,
the constituent exchanges between the aqueous phase and the gas,
the constituent exchanges between the aqueous phase and the solid phase, the constituent exchanges between constituents within the aqueous phase, the constituent exchanges with the outside of said medium.

According to an embodiment, the "single-phase reactive transport" type model can be solved implicitly from a sub-model of open OD geochemical reactor type by carrying out the following stages:

defining constituent exchange possibilities between said cells, thus defining a connection graph, determining a sweep order for said cells by analyzing said connection graph so as to sweep the cells in decreasing potential order, sweeping each cell according to said sweep order and solving said geochemical reactor type model for each cell, by means of a streamline technique.

If the decreasing potential order cannot be determined, said "single-phase reactive transport" type model can be solved in a semi-implicit manner.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION

The method according to the invention allows to determine the hydrodynamic processes leading to the transport of chemical species and the chemical processes involved in a geochemical system. The non-iterative method respects the principle of mass conservation of all the chemical elements present in the system.

The method turns to account the advantages of the sequential methods (local time intervals, parallelization, reduced memory size) while avoiding addition of another iterative loop. This method is based on the coupling of two sub-models: a model of non-reactive compositional multiphase transport type (referred to as RESERVOIR) and a single-phase reactive transport model in a given velocity field (referred to as TREACT).

The method is described hereafter within the context of the evaluation of the acid gas storage capacities of a porous medium such as a geologic reservoir. According to this embodiment, the method comprises the following five stages:

1) dividing the porous medium into a set of sub-volumes referred to as cells and defining connections between the cells, 2) establishing a system of equations defining a multiphase reactive transport model, 3) carrying out data acquisition to feed the model, 4) evaluating, from the multiphase reactive transport model, the hydrodynamic processes leading to the transport of the chemical species and the chemical processes involved in a geochemical system, 5) evaluating, from the multiphase reactive transport model, the acid gas storage capacities of the porous medium.

1) Gridding of the Porous Medium and Definition of the Connections

According to the principle of the finite-volume numerical methods, the physical domain studied (the underground reservoir) is simply divided into elementary volumes so as to form a partition of the domain. In practice, the grid cells are polygons. This is referred to as domain gridding. Each cell has its variables (pressure, concentrations, porosity, saturation, . . . ) that represent mean values of the physical variables to be observed.

The cells then have to be connected to one another by adding connections between them. These connections correspond to the possible paths of the material in the gridded reservoir. The connections thus define the possibilities of material exchange between two cells: there is a connection between two cells if these two cells can exchange material. These transfers can occur from one cell to another only (oriented connection), or between two cells in one direction or the other; the connection is then referred to as not intrinsically oriented.

Figure 4:
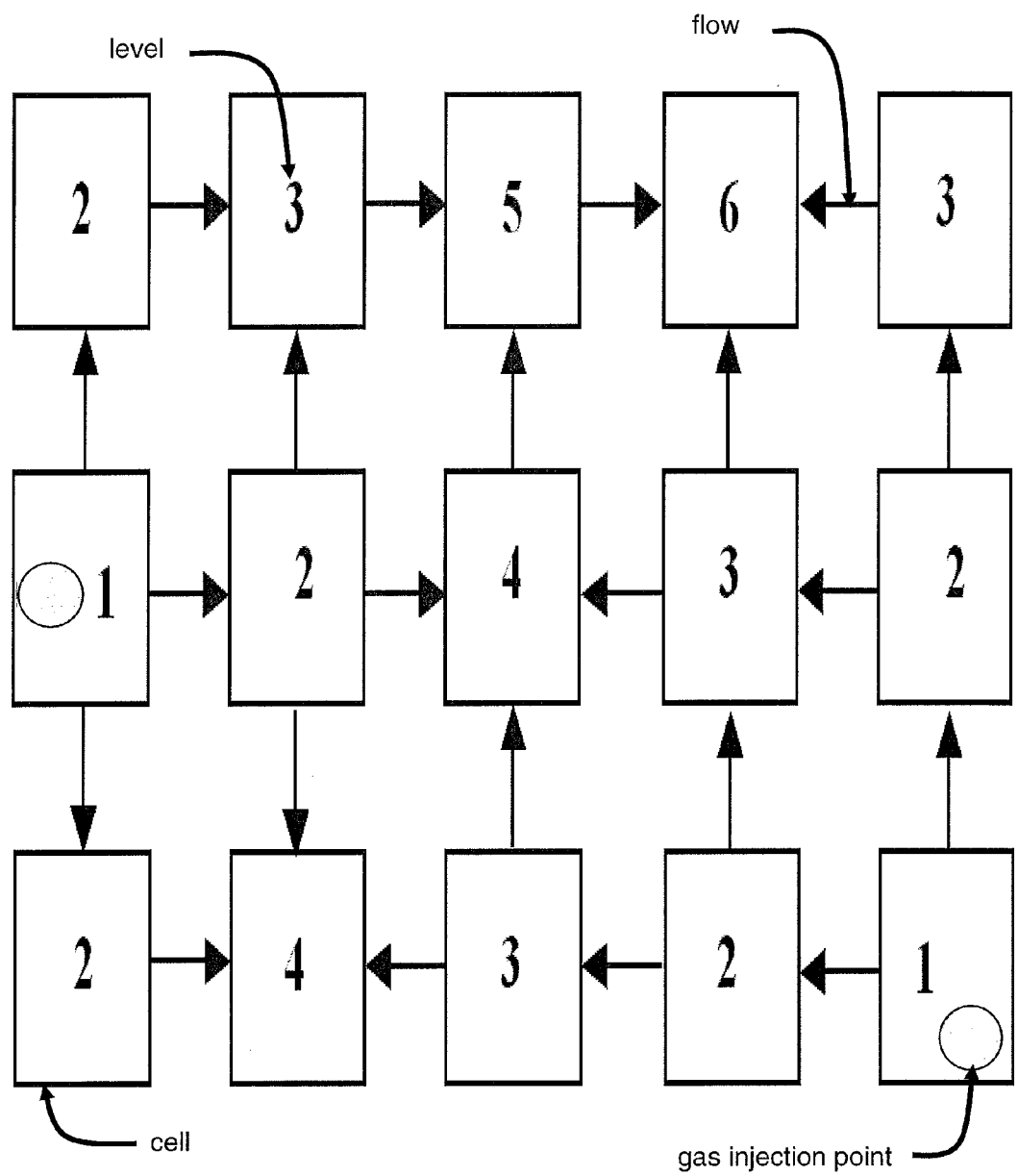
FIGS. 4 and 5 illustrate a favourable case and an unfavourable case for applying the streamline method.

A non-oriented connection graph (all of the connections between the cells) is thus defined at this stage. If all the cells of the connection graph (oriented by the water flows) can be arranged in such a way that a cell is fed only by the preceding cells, the oriented connection graph is referred to as "circuitless" as illustrated in FIG. 4. In this figure, the cells are illustrated by rectangles, the circles represent the gas injection points, and the numbers represent the levels of the cells. These levels are defined as follows: a cell can receive a flow only from a cell of lower level. Thus, level 1 corresponds to cells having only outgoing flows (injection), the cells of level 2 can receive flows only from the cells of level 1 1 . . . the cells of level 6 can receive flows from all the other cells but have no outgoing flow.

2) Definition of a Multiphase Reactive Transport Model 2.1—The Phenomena to be Modelled The phenomena involved in this model and that are to be modelled are:

A) Fluid Displacements in Porous Media Inform of 2 Phases (Water, Gas):

The fluid displacements (water and gas) are governed by the generalized Darcy's law coupled with a capillary pressure model.

B) Material Exchanges Between Phases and Constituents:
constituent exchanges between the gas phase and the water
Gas and water are variable composition phases, they can exchange constituents directly to meet physical thermodynamic equilibrium constraints (phase changes)
elements exchanges between water and minerals Rock consists of several mineral phases that can exchange material with water through chemical surface reactions: precipitation/dissolution;
elements exchanges between constituents within water Within water, the constituents can split up or combine so as to meet chemical thermodynamic equilibrium constraints (speciation reactions, mass action law).

C) Material Exchanges with the Outside of the System

The system studied is not a closed system. Material passes from the system to the outside or vice versa through wells or artificial boundaries of the system.

2.2—The Complete Multiphase Reactive Transport Model

The complete multiphase reactive transport model is based on mass conservation equations for a large number of constituents in several phases. The finite-volume scheme standpoint is adopted in this detailed description. The conservation equations are written as a balance on an elementary volume called cell. Exchange terms are then introduced in form of flows through connections connecting the various cells, source terms connecting a cell to the outside or reaction terms connecting the constituents within a cell.

In order to simplify writing of the model equations, some notations are introduced:

|M|: volume of the cell M (m³),
$\Phi$: medium porosity,
$\rho_g$: molar density of the gas phase,
$S_g$: saturation of the gas phase,
$Y_i$: molar fraction of constituent i in the gas,
$\Delta t^n$: time interval between two instants $t^n$ and $t^{n+1}$ ($\Delta t^n = t^{n+1} - t^n$),
$F_{g,\sigma}$: gas exchange flow between two cells,
$F_{g,b}$: gas exchange flow between a cell and the outside,
$T_i^{g \to w}$: material transfer of a constituent i from gas to water,
$\rho_w$: molar density of the water phase,
$S_w$: saturation of the water phase,
$W_i$: molar fraction of constituent i in the water,
$F_{w,\sigma}$: water exchange flow between two cells,
$F_{w,b}$: water exchange flow between a cell and the outside,
$T_i^{w \to g}$: material transfer of a constituent i from water to gas,
$T_i^{w \to w}$: material transfer of a constituent i within the aqueous medium,
$T_i^{w \to s}$: material transfer of a constituent i from water to solid,
$C_i$: concentration of constituent i,
$\rho_m$: molar density of the mineral,
$\Phi_m$: volume fraction of mineral m,
$T_i^{m \to w}$: material transfer of a constituent i from a mineral to water,
$n_i$: number of moles of constituent i (mol·m⁻³),
$J_{i,\sigma}$: flow term of constituent i (mol·s⁻¹),
$Q_{i,b}$: source term of constituent i (mol·s⁻¹),
$R_i$: reaction term of constituent i (mol·s⁻¹).

NB: For a constituent present in the gas phase and in the aqueous phase, two different chemical constituents are defined. The phase change can thus be written as a reaction between two constituents of the system.

The general conservation equation of any chemical constituent integrated on a volume of cell M between two instants $t^n$ and $t^{n+1}$ can be written as follows:

$$|M|(n_i^{n+1} - n_i^n) + \Delta t^n \sum_\sigma J_{i,\sigma} + \Delta t^n \sum_b Q_{i,b} + \Delta t^n R_i = 0 \quad (2)$$

The four terms of equation (2) are respectively referred to as accumulation term, flow term, source term and reaction term.

In order to close equation (2) for all the constituents i, the flow, edge and reaction terms have to be specified or eliminated. The constituents can be separated into three categories: gaseous constituents ($\alpha(i)=g$), constituents in water ($\alpha(i)=w$) and mineral constituents ($\alpha(i)=m$). Under assumptions A), B) and C) described above, the different terms of equation (2) can be detailed:

If $\alpha(i) = g$: 
$$J_{i,\sigma} = (\rho_g \cdot Y_i)_\sigma \cdot F_{g,\sigma}$$
$$Q_{i,b} = (\rho_g \cdot Y_i)_b \cdot F_{g,b}$$
$$R_i = T_i^{g \to w}$$

If $\alpha(i) = w$:
$$J_{i,\sigma} = (\rho_w \cdot W_i)_\sigma \cdot F_{w,\sigma}$$
$$Q_{i,b} = (\rho_w \cdot W_i)_b \cdot F_{w,b}$$
$$R_i = T_i^{w \to g} + T_i^{w \to w} + T_i^{w \to s}$$

If $\alpha(i) = m$:
$$J_{i,\sigma} = 0$$
$$Q_{i,b} = 0$$
$$R_i = T_i^{m \to w}$$

Terms $F_{g,\sigma}$, $F_{g,b}$, $F_{w,\sigma}$, and $F_{w,b}$ are volume flows (m³·s⁻¹). Seen from a cell of the system, the boundaries (subscript b) and the connections between cells (subscript $\sigma$) therefore have a quite similar representation. Terms $T_i^{g \to w}$, $T_i^{w \to g}$, $T_i^{w \to w}$, $T_i^{w \to s}$ and $T_i^{m \to w}$ are reaction terms, they depend on other constituents than i in the same cell. The physical reactions (phase changes) and the chemical reactions are not distinguished here. For $T_i^{w \to w}$, all the constituents are in the water phase (homogeneous reactions). For the other reactive terms, the constituents involved are in two phases (heterogeneous reactions).

2.3—Division and Coupling

Simultaneous treatment of all these phenomena inevitably leads to the solution of a large-size equations system with a large number of unknowns and of sub-models.

To solve this problem, the method is based on the combination of several sub-models coupled so as to obtain good approximation of the complete physico-chemical phenomena described above.

According to the invention, these phenomena are simply divided into two sub-models. Solution is then performed in two stages, and each one uses the complete operator where some terms are replaced by terms predicted according to the previous stages. It is assumed that the terms selected for these simplifications and the predictors proposed allow to correctly approach the problem within the context of acid gas geologic storage without an additional iteration.

The method also provides the means for coupling these two sub-models to solve the complete problem (equation (2)). This method allows to take into account all the phenomena without additional iterations while keeping a good approximation of the complete problem. The consequence of this division into sub-models is also to allow use of a method of streamline type which has many advantages, as explained hereafter.

Division of these physico-chemical phenomena is performed according to a "transfer rate" principle. A transfer rate represents the amount of material transferred per time unit, from one point of a geochemical system to another. Thus, a transfer rate corresponds to either a "flow term" if it is a transfer between two cells linked by a connection, or to a "source term" if it is a transfer between a cell and the outside of the reservoir, or to a "reaction term" if it is a transfer between constituents within a single cell.

Figure 1:
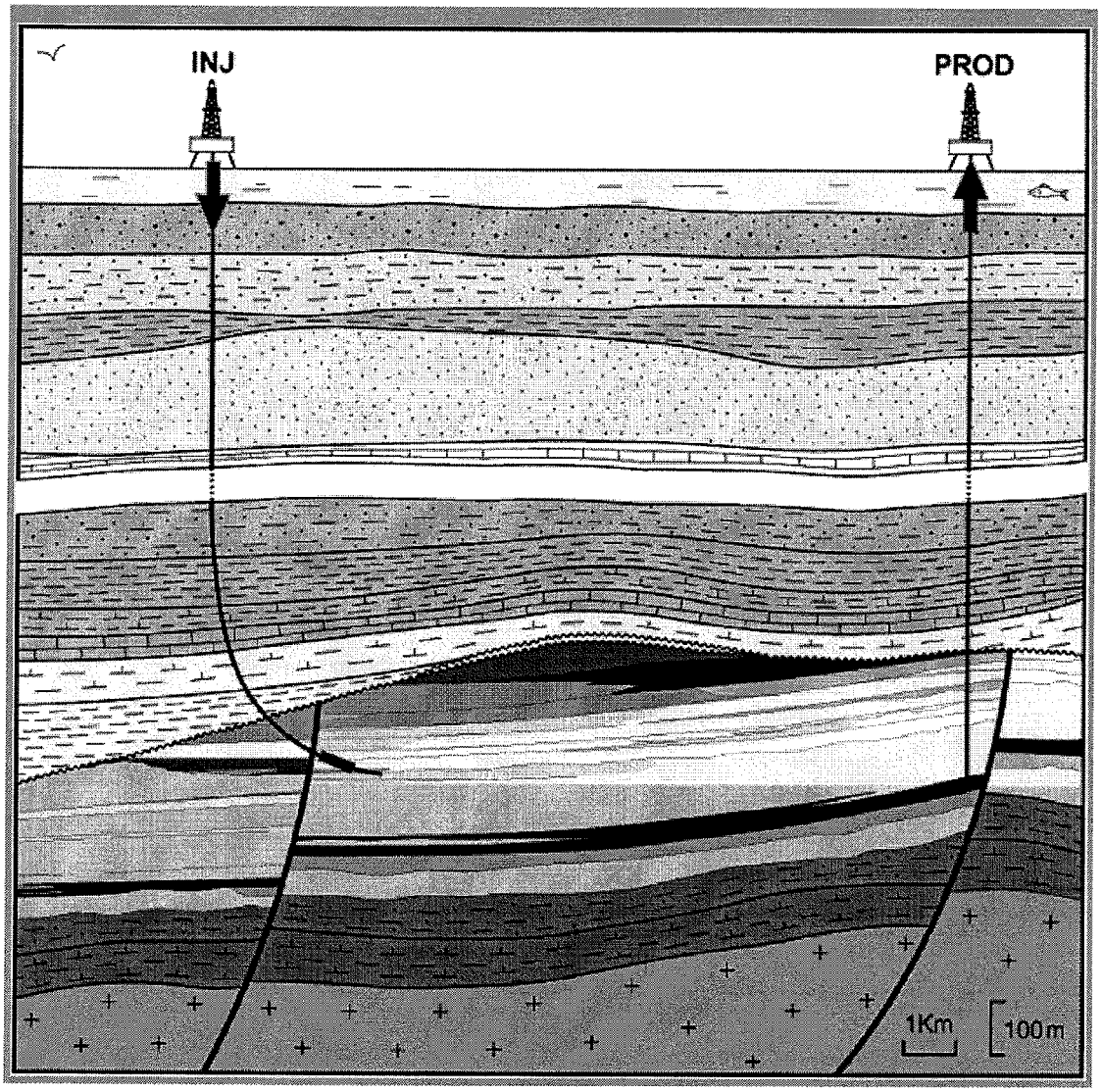
FIG. 1 diagrammatically shows an acid gas geologic storage operation.
Figure 2:
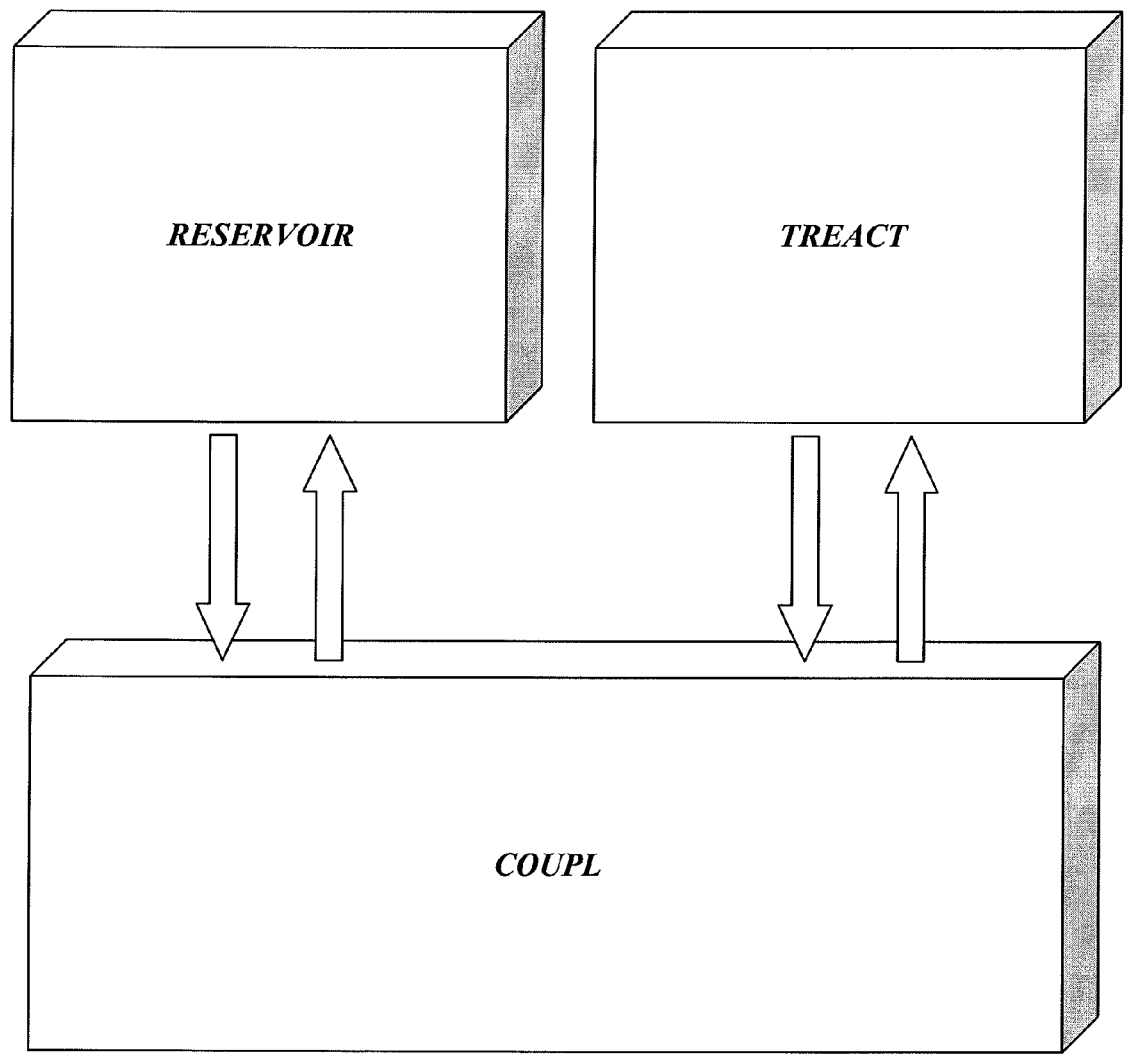
FIG. 2 diagrammatically describes the coupling between a multiphase compositional reservoir model (RESERVOIR) and a single-phase reactive transport model (TREACT), FIG. 3 describes the particular implementation of a single-phase reactive transport model (TREACT) from a geochemical type model (GEOCH) applied to streamlines.

According to the method, the transfer rates are divided into two parts, as shown in FIG. 2: a part treated by a first sub-model of "compositional multiphase reservoir" type (RESERVOIR), another by a second sub-model of "single-phase reactive transport" type (TREACT) in a given velocity field, the two sub-models being coupled by a coupler (COUPL).

Sub-Model of "Compositional Multiphase Reservoir" Type: RESERVOIR Model

The "compositional multiphase reservoir" type model is called RESERVOIR. The transfer rates treated by this first model concern all the transfers linked with gas:

1. Source terms of the gas phase (input (injection) and output (production))
2. Reaction terms of gas-water phase change type
3. Terms of gas flow within the reservoir.

Thus, for a cell volume |M| and a constituent i, the conservation equation solved by the numerical scheme is then written as follows:

For gas:

$$|M|\Phi^{n+1,(1)}\rho_g^{n+1,(1)}S_g^{n+1,(1)}Y_i^{n+1,(1)} - \quad (3)$$
$$|M|\Phi^{n,(1)}\rho_g^{n,(1)}S_g^{n,(1)}Y_i^{n,(1)} + \Delta t^{n,(1)}\sum_\sigma (\rho_g Y_i)_\sigma^{n+1,(1)} F_{g,\sigma}^{n+1,(1)} +$$
$$\Delta t^{n,(1)}\sum_b (\rho_g Y_i)_b^{n+1,(1)} F_{g,b}^{n+1,(1)} + \Delta t^{n,(1)} T_i^{g\to w,n+1,(1)} = 0$$

For water:

$$|M|\Phi^{n+1,(1)}\rho_w^{n+1,(1)}S_w^{n+1,(1)}W_i^{n-1,(1)} - |M|\Phi^{n,(1)}\rho_w^{n,(1)}S_w^{n,(1)}W_i^{n,(1)} + \quad (4)$$
$$\Delta t^{n,(1)}\sum_\sigma (\rho_w W_i)_\sigma^{n+1,(1)} F_{w,\sigma}^{n+1,(1)} + \Delta t^{n,(1)}\sum_b (\rho_w W_i)_b^{n+1,(1)} F_{w,b}^{n+1,(1)} +$$
$$\Delta t^{n,(1)} T_i^{w\to g,n+1,(1)} + \Delta t^{n,(1)}(T_i^{w\to w,(2)} + T_i^{w\to s,(2)}) = 0$$

The transfers in water are in fact calculated twice. Once within the context of transfers linked with gas, as a prediction, and once by the sub-model of "single-phase reactive transport" type (TREACT model).

In order to take into account the porosity changes linked with the chemical reactions, a volume correction is integrated as follows:

$$\Phi^{n+1,(1)} = \Phi^{n,(2)} \quad (5)$$

These three equations (3), (4) and (5) make up the "compositional multiphase reservoir" type model (RESERVOIR model).

The inputs of this RESERVOIR model are as follows:
From a RESERVOIR calculation (superscript[(1)])
  $\Phi^{n,(1)}$: porosity on date $t_n$
  $S_g^{n,(1)}, S_w^{n,(1)}$: gas and water saturations on date $t_n$
  $Y_i^{n,(1)}, W_i^{n,(1)}$: molar fractions of constituents in the water and gas phases on date $t_n$.
  $\rho_w^{n,(1)}, \rho_g^{n,(1)}$: molar densities of the water and gas phases on date $t_n$.
From a TREACT calculation (superscript[(2)])
  $\Phi^{n,(2)}$ modified porosity deduced on date $t_n$
  $T_i^{w\to w,n,(2)}, T_i^{w\to s,n,(2)}$: water-water and water-rock chemical reaction rates on date $t_n$.

The outputs of this RESERVOIR model are as follows (superscript[(1)]):
Standard outputs
  $\Delta t^{n,(1)}$: time interval between $t_n$ and $t_{n+1}$
  $\Phi^{n+1,(1)}$: porosity on date $t_{n+1}$
  $S_g^{n+1,(1)}, S_w^{n+1,(1)}$: saturations on date $t_{n+1}$
  $Y_i^{n+1,(1)}, W_i^{n+1,(1)}$: molar fractions in the water and gas phases on date $t_{n+1}$
  $\rho_w^{n+1,(1)}, \rho_g^{n+1,(1)}$: molar densities of the water and gas phases on date $t_{n+1}$.
More specific outputs
  $F_{g,o}^{n+1,(1)}, F_{w,o}^{n+1,(1)}$: volume flows per water phase connection on date $t_{n+1}$
  $F_{g,b}^{n+1,(1)}, F_{w,b}^{n+1,(1)}$: volume flows per water phase boundary on date $t_{n+1}$
  $T_i^{g,n+1,(1)}, T_i^{g\to w,n+1,(1)}$: water-gas reaction transfer rates on date $t_{n+1}$.

Sub-Model of "Single-Phase Reactive Transport" Type: TREACT Model

This model is called TREACT. The transfer rates treated by the second model, of "single-phase reactive transport" type, concern all the material transfers linked with the water and the rock:
1. Reaction terms of precipitation/dissolution type between water and minerals
2. Reaction terms of speciation type within the water phase
3. Terms of water flow within the reservoir
4. Source terms of the water phase.

For the water:

$$|M|\Phi^{n+1,(1)}S_w^{n+1,(1)}C_i^{n+1,(2)} - |M|\Phi^{n,(1)}S_w^{n,(1)}C_i^{n,(2)} + \quad (6)$$
$$\Delta t^{n,(1)}\sum_\sigma (C_i)_\sigma^{n+1,(2)} F_{w,\sigma}^{n+1,(1)} + \Delta t^{n,(1)}\sum_b (C_i)_b^{n-1,(2)} F_{w,b}^{n+1,(1)} +$$
$$\Delta t^{n,(1)} T_i^{w\to g,n+1,(1)} + \Delta t^{n,(1)}(T_i^{w\to w,n+1,(2)} + T_i^{w\to s,n+1,(2)}) = 0$$

For the mineral phase:

$$|M|\Phi_m^{n+1,(2)}\rho_m - |M|\Phi_m^{n,(2)}\rho_m + \Delta t^{n,(1)} T_i^{m\to w,n+1,(2)} = 0 \quad (7)$$

And we add:

$$\Phi^{n+1,(2)} = 1 - \sum_m \Phi_m^{n+1,(2)} \quad (8)$$

These three equations (6), (7) and (8) make up the "single-phase reactive transport" type model (TREACT model)

The inputs of this TREACT model are as follows:
From a RESERVOIR calculation (superscript[(1)])
  $\Delta t^{n,(1)}$: time interval between $t_n$ and $t_{n+1}$
  $\Phi^{n,(1)}, \Phi^{n+1,(1)}$: porosities on dates $t_n$ and $t_{n+1}$
  $S_w^{n,(1)}, S_w^{n+1,(1)}$: water saturations on dates $t_n$ and $t_{n+1}$
  $F_{w,\sigma}^{n+1,(1)}$: volume flows per water phase connection on date $t_{n+1}$
  $F_{w,b}^{n+1,(1)}$: volume flows per water phase boundary on date $t_{n+1}$
  $T_i^{w\to g,n+1,(1)}$: water-gas reaction transfer rate on date $t_{n+1}$
From a TREACT calculation (superscript[(2)])
  $C_i^{n,(2)}$: constituents concentrations in the water (molarities) on date $t_n$
  $\rho_m$: density of the minerals
  $\Phi_m^{n,(2)}$: volume fraction of minerals on date $t_n$.

The outputs of this TREACT model are as follows (superscript[(2)]):
Standard outputs
  $C_i^{n+1,(2)}$: constituents concentrations in the water (molarities) on date $t_{n+1}$ $\Phi_m^{n+1,(2)}$: volume fractions of minerals on date $t_{n+1}$
More specific outputs
  $T_i^{w\to w,n+1,(2)}$: water-water reaction transfer rate on date $t_{n+1}$
  $T_i^{w\to s,n+1,(2)}$: water-rock reaction transfer rate on date $t_{n+1}$
  $\Phi^{n+1,(2)}$: modified porosity deduced on date $t_{n+1}$
  $T_i^{m\to w,n+1,(2)}$: detail per mineral of the water-rock reaction transfer rates on date $t_{n+1}$.

The complete multiphase reactive transport model is treated by means of these two sub-models so as to distribute the phenomena treated. Knowledge of all the transfer terms by means of these two sub-models allows to precisely know the state of the system at any time t>0, considering its initial state on date t=0. In other words, these transfer terms entirely determine the evolution of the geochemical system studied.

3) Acquisition of the Necessary Data for the Model

The input data of the RESERVOIR model for initialization are obtained either by means of in-situ tests such as seismic surveys and well tests, or by direct measurements on samples (cores). There are three types of data:

characterization of the porous medium (permeability, porosity, facies, . . . ), characterization of the fluids (fluid thermodynamic data), cross-characterization (relative permeabilities).

The input data of the TREACT model for initialization are data obtained from laboratory experiments and associated calorimetric measurements. The kinetic data relative to the precipitation/dissolution reactions are not as well known as the thermodynamic type data, they often have to be adjusted as and when the need arises.

4) Constituents Transport and Chemical Processes Evaluation

In general terms, the method according to the invention allows to determine, on the one hand, the hydrodynamic processes leading to the transport of chemical constituents and, on the other hand, the chemical processes involved in a geochemical system.

The method according to the invention is based on a time-dependent evolution scheme. A model reproducing the evolution with time of precise physical phenomena is used. Since a complete period of time cannot be reproduced in one go, it is divided up into a finite number of sub-times referred to as "time intervals" (evolution in discrete time). The length of these time intervals is not constant: the period is divided into discrete time intervals whose size may change during simulation. Each stage furthers the simulation by a strictly positive time interval and in a normal situation, the final time ($T_f$) is reached in a number of stages smaller than $(T_f-T_0)/\Delta_t^{min}$, with $T_0$ the initial time and $\Delta_t^{min}$ the allowed minimum time interval. This minimum interval is selected to limit the number of stages (one stage per time interval) and thus constitutes a stop criterion.

Once initialization of each input datum of the models performed (by measurements, prior modelling, . . . ), modelling of the transport and chemical reaction processes within the geochemical system is done schematically in five main stages for each time interval:

A—Synchronization of the two sub-models

B—Solution of the RESERVOIR sub-model

C—RESERVOIR results and preparation of the TREACT calculation

D—Solution of the TREACT sub-model

E—TREACT results and preparation of the RESERVOIR calculation (next time interval)

Stage A: Synchronization of the Sub-Models

Synchronization of the time interval start consists in estimating a new time interval for the next calculation. This stage also allows to carry out the necessary operations to bring the models back to a state allowing them to do stages B, C, D and E again.

If the minimum time interval is reached, the program is stopped by returning an error, the simulation has failed.

Stage B: Solution of the RESERVOIR Sub-Model

In this stage, the chemical reaction terms (water-water and water-rock) are replaced by a prediction calculated by taking account of the previous TREACT calculations (in the previous time interval).

The system to be solved is defined by equations (3), (4) and (5). In principle, this problem is of standard type and it can be solved by any sub-model of "non-reactive multiphase compositional transport" type (see [6]).

Stage C: RESERVOIR Results and Preparation of the TREACT Calculation

The data resulting from the solution of the RESERVOIR sub-model are used to predict a large number of terms that appear in the TREACT sub-model. These terms are the volume flow of water at the connections and the boundaries, and water-gas reaction terms. The water and gas volumes predicted by the RESERVOIR sub-model are also used.

Stage D: Solution of the TREACT Sub-Model

This stage is similar to a reactive flow stage with a single mobile phase (water) in a given velocity field. For a cell M and a constituent i, the conservation equation solved by the numerical scheme is written according to equations (6) and (7).

In principle, this problem is of standard type and it can be solved by any sub-model of "single-phase reactive transport" type.

Figure 3:
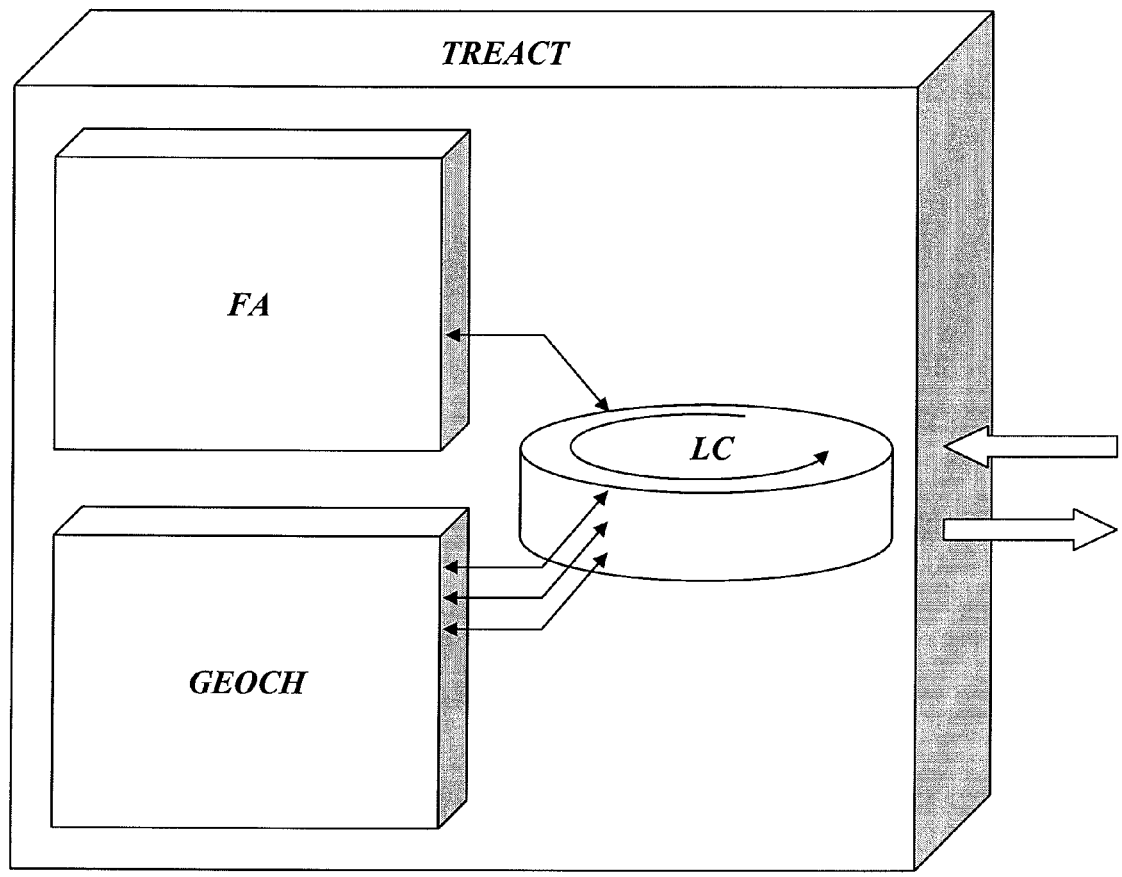

However, according to a particular embodiment of the invention, a "single-phase reactive transport" type sub-model can be defined from an existing geochemical model. Such a solution of the "single-phase reactive transport" type model (TREACT) in a given velocity field is proposed and illustrated in FIG. 3. According to this solution mode, geochemistry calculations are carried out cell by cell by means of a model of geochemical type (GEOCH) while using an analysis of the connection graph (FA) to make these calculations according to a streamline principle (LC). These calculations provide the outputs of the "single-phase reactive transport" type model (TREACT). More in detail, the TREACT model comprises two main stages:

the flow analysis (FA) that corresponds to seeking the cell sweep order in the oriented graph. This stage thus takes at the input the graph oriented by the flows and gives at the output if yes or no the flow is of potential type and, if the flow is of potential type, the order following which the cells should be swept, the distribution of the chemistry calculation (LC): for each cell, the calculation is prepared by recovering the flows entering and leaving this cell, and the geochemical calculation (GEOCH) is launched. The results are recorded. The GEOCH model is called as many times as there are cells and it works on different data each time.

This method has two advantages: on the one hand, there are many geochemical models and the method can therefore apply independently of the selection thereof. On the other hand, this model uses the specific properties of the problem: it is a method based on an analysis of a connection graph and a distribution of the geochemistry calculations on streamlines. The method is described below.

The scheme as described above is in principle an implicit scheme, the flow terms, the source terms and the reaction terms involve variables on date $t_{n+1}$ that are unknowns of the problem. Implicit type methods are known to be unconditionally stable. This can be proved rigorously on academic examples. Practice has shown that, in fact, writing an implicit scheme stabilizes the calculation in many cases.

Using an implicit scheme requires an iterative method for solving a system of large-size non-linear equations. This method usually involves deriving all of the conservation equation terms in relation to the main variables selected.

The basic idea is here to use the properties of the water velocity field of "potential-derived field" type to avoid this costly solution. Examples of fields that derive from a potential are:

Electric field E derives from electric potential V. In fact, we can write:

$$E = -grad(V)$$

the earth gravitational field G also derives from a potential energy $E_p$. In fact, we can write:

$$G = -grad(E_p)$$

The Darcy velocity $V_w$ used to calculate the volume flow for the connections and the boundaries can be written in the following form:

$$V_w = \frac{K * k_r}{\mu_w} * (grad(P) + \rho_w * G)$$

with:
- $V_w$: Darcy velocity of the water phase
- K: permeability of the porous medium
- $k_r$: relative permeability
- $\mu_w$: viscosity
- P: pressure
- $\rho_w$: density
- G: gravity vector.

It is not in the form: $V_w = grad(Q)$, where Q would be a potential. However, by means of a usual transformation (see [7]), when the density of the water does not vary much, we can write:

$$V_w = K_H * grad(H)$$

H being the hydraulic head and $K_H$ the hydraulic conductivity.

Consequently, even if $V_w$ does not directly derive from a potential, its direction is proportional to grad(H) that derives from a potential (the hydraulic head). It is sufficient to assume that the displacement occurs in the direction of the decreasing hydraulic load potentials. A potential type flow will be referred to hereafter.

Figure 5:
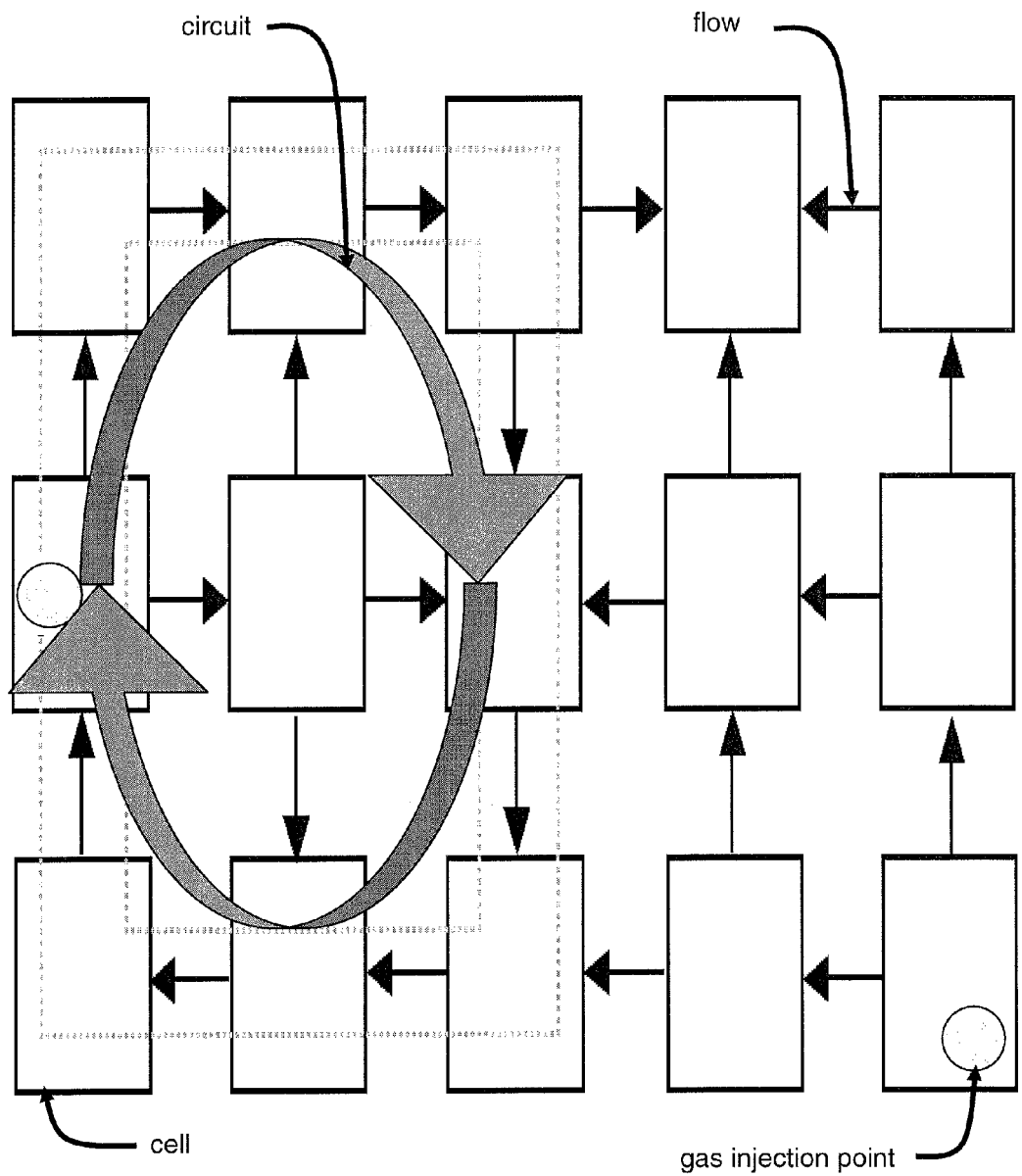

The low variability properties of the density are assumed to be established and therefore the flow of the water is assumed to be of potential type. In practice, an implicit implementation of the TREACT model is proposed in cases where the following property is established: all the cells of the connection graph (oriented by the water flows) can be arranged in such a way that a cell is fed only by preceding cells. In the oriented graph theory, the oriented graph is referred to as "circuitless" as illustrated in FIG. 4, where the numbers represent the levels of each cell (rectangle) and the circles represent the injection points. On the other hand, FIG. 5 illustrates the case of an oriented circuit graph. It is checked a posteriori that this property is true but neither H nor any other potential is calculated.

The cell sweep direction is rapidly determined and it allows to:
- triangularize the part of the system (extra-diagonal block) that connects the cells to one another. Consequence: solution of a large non-linear system amounts to carrying out a calculation on a cell, then in replacing the result in the equations of the other cells for each cell in the sweep order determined;
- group cells into levels allowing them to be treated in parallel. The calculations of all the reactions occurring on the cells of equal level can be carried out independently, therefore on different processors or machines. In practice, in real cases, the levels are very important (a hundred cells), the calculations can thus be best distributed. This is the second advantage of this method.

In the presence of great density variations, that can be caused by a high dissolution of gas or of mineral salts in the water, and to keep a chemistry distribution algorithm, we propose to use only implicit reactions and explicit flows. A semi-implicit scheme is thus obtained. The cell calculations become independent and the whole calculation can be parallelized.

Stage E: TREACT Results and Preparation of the RESERVOIR Calculation

The data obtained by solving the TREACT sub-model are used to predict terms that appear in the RESERVOIR model equations. These are the porosity variations and the transfers of water-water and water-rock chemical reaction type.

To calculate the porosity variation in the TREACT sub-model, a simple difference is calculated:

$$\Phi^{n+1,(2)} = 1 - \sum_m \Phi_m^{n+1,(2)} \quad (9)$$

To calculate the balance of the transfers linked with the water-water and water-rock reaction terms ($T_i^{w,w,n,(2)} + T_i^{w,s,n,(2)}$), the same difficulty as for calculation of the water-gas reaction terms in stage C arises because, here again, some reactions can be assumed to be instantaneous. The procedure is the same: once the variables at time $t_{n+1}$ have been calculated, equation (6) where all the other terms are known is used to deduce the value of the term sought.

5) Evaluation of the Acid Gas Storage Capacities of the Medium

Applied to a geologic reservoir, the method allows to determine the acid gas storage capacities of this reservoir, for $CO_2$ for example.

In fact, the phenomena modelled are:
- the fluid displacements in porous media in form of 2 phases (water, gas),
- the exchange of constituents between the gas phase and the water (phase change),
- the exchange of constituents between the water and the minerals (precipitation, dissolution),
- the exchange of elements between constituents within the water (speciation reactions),
- the material exchanges with the outside of the system (well, boundary conditions).

Thus, after the calculations from the various models, the following properties are known:
- $\Delta t^n$: time interval between $t_n$ and $t_{n+1}$
- $\Phi^{n+1}$: porosity on date $t_{n+1}$
- $S_g^{n+1}, S_w^{n+1}$: saturations on date $t_{n+1}$
- $Y_i^{n+1}, W_i^{n+1}$: molar fractions in the water and gas phases on date $t_{n+1}$
- $\rho_w^{n+1}, \rho_g^{n+1}$: molar densities of the water and gas phases on date $t_{n+1}$
- $F_{g,o}^{n+1}, F_{w,o}^{n+1}$: volume flows per water phase connection on date $t_{n+1}$
- $F_{g,b}^{n+1}, F_{w,b}^{n+1}$: volume flows per water phase boundary on date $t_{n+1}$
- $T_i^{w \to g, n+1}, T_i^{g \to w, n+1}$: water-gas reaction transfer rate on date $t_{n+1}$
- $C_i^{n+1}$: constituents concentrations in the water (molarities) on date $t_{n+1}$
- $\Phi_m^{n+1}$: volume fractions of minerals on date $t_{n+1}$
- $T_i^{w \to w}, T_i^{w \to s}$: water-water and water-rock reaction transfer rate
- $\Phi_{n+1,(2)}$ modified porosity deduced on date $t_{n+1}$.

It is then possible to determine, for any time t, the amount of gas present in the reservoir, the amount of gas that precipitates during time period t, the amount of gas dissolved in the aqueous phase during time period t, the amount that migrates in the reservoir, the amount that migrates in the subsurface outside the reservoir and the amount that migrates to the surface. It is also possible to determine the alteration level of the reservoir in relation to the precipitation and dissolution reactions.

The model can then be used in two ways:

Injection Phase

During the phase of injection of acid gases into the geologic reservoir, the method allows to define an injection strategy and thus to optimize filling of the reservoir.

Among the above parameters, the porosity and the water-rock reaction rates can for example allow to monitor clogging at the well level.

Storage Phase

During the storage phase, the method is predictive. It allows to study the reservoir stability through time and thus to anticipate leakage problems (impact on the environment). In fact, the precipitation and dissolution reactions can alter the quality of the reservoir in the long term. Degradation of the reservoir quality can then act as a brake on storage or even stop it. It is therefore very important to determine the amount of gas that precipitates, the amount that migrates within the reservoir, in the subsurface or at the surface.

The method allows in particular to locate and to determine the amount of $CO_2$ present in the reservoir at the time t, in gas form, dissolved in the water or precipitated (carbonates).

Among the above parameters, the composition and the volumes of the phases (gas, water and minerals) are particularly interesting for engineers.

The method can also find direct applications in the study of soil depollution using multiphase processes (venting, use of chlorinated solvents).

The method according to the invention thus allows to determine the acid gas ($H_2S$, $CO_2$, $CH_4$) storage capacities of an underground medium by modelling transport and chemical reaction processes in porous media.

As for modelling, the method turns to good account the advantages of the sequential methods (local time intervals, parallelization, reduced memory size) while avoiding addition of another iterative loop. The advantages are then as follows:

decrease in the total calculating time required for a simulation in relation to an iterative sequential method while keeping the possibility to carry out calculations in parallel cell by cell;

modular approach allowing to create a complete model from existing and more limited RESERVOIR and TREACT sub-models;

easily parallelizable implementation of the TREACT model based on a flow analysis and 0D calculation distribution method of geochemical type on streamlines.

As for acid gas storage, the method provides a tool that is essential to specialists for modelling the transport and chemical reaction processes of an underground porous medium by giving a precise description of the dynamic behaviour of the fluids in the geologic medium while simulating the largest part of the chemical processes involved in the aqueous phase.

The method provides complete treatment of the multiphase compositional problem representing an acid gas ($H_2S$, $CO_2$, $CH_4$) storage.

The invention claimed is:

1. A computer-implemented method for determining the capacities of an underground geologic medium for storage of at least one acid gas, the underground geologic medium comprising a solid phase and an aqueous phase, characterized in that the method comprises the following steps:

a) dividing said underground geologic medium into a set of sub-volumes referred to as cells;

b) defining a multiphase reactive transport model by coupling:

(i) a sub-model of a compositional multiphase reservoir, that is dedicated to determination of the transfer rates linked with the at least one acid gas, with (ii) a sub-model of a single-phase reactive transport, that is dedicated to determination of the transfer rates linked with said aqueous phase and said solid phase;

c) carrying out data acquisition so as to initialize said multiphase reactive transport model;

d) determining through computer-implemented calculations, for a given time period t, values for chemical constituents transport processes and chemical reaction processes within said underground geologic medium, by solving said multiphase reactive transport model at any cell of said underground geologic medium, so as to obtain at least the following values:

(i) an amount of the at least one acid gas present in said underground geologic medium, that have at least one of (1) migrated outside said underground geologic medium and to the surface and (2) precipitated and dissolved in the aqueous phase, and (ii) an amount of the solid phase alterations caused by precipitation and dissolution;

e) outputting the results of step d);

f) deducing therefrom the capacities of said underground geologic medium for storing the at least one gas.

2. A method as claimed in claim 1, wherein said reactive transport model is solved over said time period t by means of a time-dependent evolution scheme wherein said time period is divided into a finite number of time intervals and by carrying out the following steps:

a) defining the duration of a time interval to synchronize the two sub-model;

b) solving said compositional multiphase reservoir sub-model;

c) solving said single-phase reactive transport sub-model by means of the results obtained in step b);

d) changing the duration of said time interval and repeating the procedure from step b) by taking account of the results obtained in step c) until said time period t is covered.

3. A method as claimed in claim 1, wherein said transfer rates linked with the at least one acid gas comprise at least one of the following terms:

a) source terms of said at least one acid gas;

b) terms of phase change between the at least one acid gas and the aqueous phase;

c) terms of gas flow within said underground geologic medium.

4. A method as claimed in claim 1, wherein said transfer rates linked with said aqueous phase and said solid phase comprise at least one of the following terms:

a) terms of precipitation and dissolution reactions between the aqueous phase and the solid phase;

b) terms of speciation reaction within the aqueous phase;

c) terms of aqueous phase flow within said underground geologic medium;

d) source terms of the aqueous phase.

5. A method as claimed in claim 1, wherein at least one of the following phenomena is determined from said multiphase reactive transport model:

a) the displacements of said aqueous phase and of said at least one acid gas;

b) the constituent exchanges between the aqueous phase and the at least one acid gas;
c) the constituent exchanges between the aqueous phase and the solid phase;
d) the constituent exchanges between constituents within the aqueous phase;
e) the constituent exchanges between the underground geologic medium and the surface outside of underground geologic medium.

6. A method as claimed in claim 1, wherein the single-phase reactive transport sub-model is solved implicitly from an open 0D geochemical reactor sub-model by carrying out the following steps:
a) defining constituent exchange possibilities between said cells, thus defining a connection graph;
b) determining a sweep order for said cells by analyzing said connection graph so as to sweep the cells in decreasing potential order;
c) sweeping each cell according to said sweep order and solving said geochemical reactor sub-model for each cell, by means of a streamline technique.

7. A method as claimed in claim 6, wherein said single-phase reactive transport sub-model is solved in a semi-implicit manner when the decreasing potential order cannot be determined.

8. A method as claimed in claim 1, wherein:
a) said sub-model of a compositional multiphase reservoir comprises an equation for mass conservation for gas, an equation for mass conservation for aqueous phase, and a volume correction in order to take into account porosity changes linked with chemical reactions; and
b) said sub-model of a single-phase reactive transport comprises an equation for mass conservation for aqueous phase, an equation for mass conservation for solid phase, and a volume correction in order to take into account porosity changes linked with chemical reactions.

9. A method as claimed in claim 1, wherein:
carrying out data acquisition so as to initialize said multiphase reactive transport model includes at least one of: an in-situ test, a direct measurement of a sample, a laboratory experiment, and a calorimetric measurement.

10. A computer-implemented method for determining the capacities of an underground geologic medium for storage of at least one acid gas, the underground geologic medium comprising a solid phase and an aqueous phase, characterized in that the method comprises the following steps:
a) dividing the underground geologic medium into a set of sub-volumes referred to as cells;
b) defining a multiphase reactive transport model by coupling:
(i) a compositional multiphase reservoir sub-model, that is dedicated to determination of the transfer rates linked with the at least one acid gas, with
(ii) a single-phase reactive transport sub-model, that is dedicated to determination of the transfer rates linked with the aqueous phase and the solid phase;
c) carrying out data acquisition so as to initialize the multiphase reactive transport model;
d) executing computer-implemented calculations for a given time period t, to determine values of chemical constituents transport processes and chemical reaction processes for any cell of the underground geologic medium, by executing the multiphase reactive transport model comprising the compositional multiphase reservoir sub-model coupled with the single-phase reactive transport sub-model, so as to obtain at least the following values:
(i) an amount of the at least one acid gas present in the underground geologic medium, that have at least one of (1) migrated outside the underground geologic medium and to the surface, and (2) precipitated and dissolved in the aqueous phase, and
(ii) an amount of the solid phase alterations caused by precipitation and dissolution;
e) outputting the results of step d);
f) deducing, from the results of step d), the capacities of the underground geologic medium for storing the at least one acid gas.

11. A method as claimed in claim 10, wherein:
a) said compositional multiphase reservoir sub-model comprises an equation for mass conservation for gas, an equation for mass conservation for aqueous phase, and a volume correction in order to take into account porosity changes linked with chemical reactions; and
b) said single-phase reactive transport sub-model comprises an equation for mass conservation for aqueous phase, an equation for mass conservation for solid phase, and a volume correction in order to take into account porosity changes linked with chemical reactions.

12. A method as claimed in claim 10, wherein:
carrying out data acquisition so as to initialize said multiphase reactive transport model includes at least one of: an in-situ test, a direct measurement of a sample, a laboratory experiment, and a calorimetric measurement.

* * * * *